United States Patent [19]

Adams et al.

[11] Patent Number: 5,777,142

[45] Date of Patent: Jul. 7, 1998

[54] UNSATURATED HYDROXYCARBOXYLIC COMPOUNDS USEFUL AS INTERMEDIATES FOR PREPARING LUBRICANT AND FUEL ADDITIVES

[75] Inventors: Paul E. Adams, Willoughby Hills; Mark R. Baker, Lyndhurst; Jeffry G. Dietz, University Heights, all of Ohio

[73] Assignee: The Lubrizol Corporation, Wickliffe, Ohio

[21] Appl. No.: 518,629

[22] Filed: Aug. 22, 1995

[51] Int. Cl.[6] ................................................ C07C 59/00
[52] U.S. Cl. .................... 554/213; 554/219; 560/179; 560/183; 560/205; 562/512; 562/570; 562/587; 562/598; 252/56 R; 525/383; 525/386
[58] Field of Search ................ 554/213, 219; 560/179, 183, 205; 562/512, 570, 587, 598; 252/56 R; 525/383, 386

[56] References Cited

U.S. PATENT DOCUMENTS

| | | | |
|---|---|---|---|
| 4,412,031 | 10/1983 | Kitahara et al. | 524/526 |
| 4,412,041 | 10/1983 | Kitahara et al. | 525/154 |
| 4,525,541 | 6/1985 | Kitahara et al. | 525/337 |
| 4,654,435 | 3/1987 | Kitahara et al. | 560/61 |
| 4,704,427 | 11/1987 | Kitahara et al. | 524/531 |

FOREIGN PATENT DOCUMENTS

| | | |
|---|---|---|
| 0603889 | 6/1994 | European Pat. Off. |
| 0624638 | 11/1994 | European Pat. Off. |
| 2103688 | 8/1972 | Germany |
| 1354907 | 5/1974 | United Kingdom |

*Primary Examiner*—Gary Geist
*Assistant Examiner*—Deborah D. Carr
*Attorney, Agent, or Firm*—Joseph P. Fischer; James L. Cordek

[57] ABSTRACT

Compositions comprising unsaturated hydroxycarboxylic compounds, a process for reacting olefinic compounds with carboxylic reagents and products prepared by the process. The compositions containing the hydroxycarboxylic compounds and the products of the process are useful as intermediates for preparing additives for lubricants and fuels.

42 Claims, No Drawings

UNSATURATED HYDROXYCARBOXYLIC COMPOUNDS USEFUL AS INTERMEDIATES FOR PREPARING LUBRICANT AND FUEL ADDITIVES

FIELD OF THE INVENTION

This invention relates to unsaturated hydroxycarboxylic compounds which are intermediates for the preparation of low chlorine containing additives for lubricating oils and normally liquid fuels and to a process for preparing the compounds.

BACKGROUND OF THE INVENTION

Numerous types of additives are used to improve lubricating oil and fuel compositions. Such additives include, but are certainly not limited to dispersants and detergents of the ashless and ash-containing variety, oxidation inhibitors, anti-wear additives, friction modifiers, and the like. Such materials are well known in the art and are described in many publications, for example, Smalheer, et al, "Lubricant Additives", Lezius-Hiles Co., Cleveland, Ohio, USA (1967); M. W. Ranney, Ed., "Lubricant Additives", Noyes Data Corp., Park Ridge, N.J., USA (1973); M. J. Satriana, Ed., "Synthetic Oils and Lubricant Additives, Advances since 1979, Noyes Data Corp., Park Ridge N.J., USA (1982), W. C. Gergel, "Lubricant Additive Chemistry", Publication 694-320-65R1 of the Lubrizol Corp., Wickliffe, Ohio, USA (1994); and W. C. Gergel et al, "Lubrication Theory and Practice" Publication 794-320-59R3 of the Lubrizol Corp., Wickliffe, Ohio, USA (1994); and in numerous United States patents, for example Chamberlin, II, U.S. Pat. No. 4,326,972, Schroeck et al, U.S. Pat. No. 4,904,401, and Ripple et al, U.S. Pat. No. 4,981,602. Many such additives are frequently derived from carboxylic reactants, for example, acids, esters, anhydrides, lactones, and others. Specific examples of commonly used carboxylic compounds used as intermediates for preparing lubricating oil additives include alkyl-and alkenyl substituted succinic acids and anhydrides, polyolefin substituted carboxylic acids, aromatic acids, such as salicylic acids, and others. Illustrative carboxylic compounds are described in Meinhardt, et al, U.S. Pat. No. 4,234,435; Norman et al, U.S. Pat. No. 3,172,892; LeSuer et al, U.S. Pat. No. 3,454,607 and Rense, U.S. Pat. No. 3,215,707.

Many carboxylic intermediates used in the preparation of lubricating oil additives contain chlorine. While the amount of chlorine present is often only a very small amount of the total weight of the intermediate, the chlorine frequently is carried over into the carboxylic derivative which is desired as an additive. For a variety of reasons, including environmental reasons, the industry has been making efforts to reduce or to eliminate chlorine from additives designed for use as lubricant or fuel additives.

Accordingly, it is desirable to provide low chlorine or chlorine free intermediates which can be used to prepare low chlorine or chlorine free derivatives for use in lubricants and fuels.

The present invention provides unsaturated hydroxycarboxylic compounds which meet this requirement.

B. B. Snider and J. W. van Straten, J. Org. Chem., 44, 3567–3571 (1979) describe certain products prepared by the reaction of methyl glyoxylate with several butenes and cyclohexenes. K. Mikami and M. Shimizu, Chem. Rev., 92, 1021–1050 (1992) describe carbonyl-ene reactions, including glyoxylate-ene reactions. D. Savostianov (communicated by P. Pascal), C.R. Acad. Sc. Paris, 263, (605–7) (1966) relates to preparation of some a-hydroxylactones via the action of glyoxylic acid on olefins. M. Kerfanto et. al., C.R. Acad. Sc. Paris, 264, (232–5) (1967) relates to condensation reactions of α-α-di-(N-morpholino)-acetic acid and glyoxylic acid with olefins.

SUMMARY OF THE INVENTION

The present invention provides a composition comprising a compound of the formula

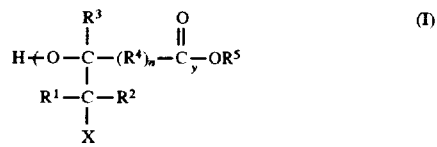

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

$R^5$ is H or hydrocarbyl; and

X is a group of the formula

wherein each of $R^6$, $R^7$ and $R^8$ is independently H or a hydrocarbon based group, provided that at least one of $R^1$, $R^2$, $R^6$, $R^7$ and $R^8$ is a hydrocarbon based group containing at least 7 carbon atoms.

In another aspect of this invention, there is provided a process for reacting, optionally in the presence of an acidic catalyst, (A) at least one olefinic compound of the general formula

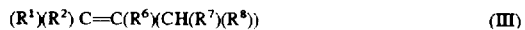

wherein each of $R^1$ and $R^2$ is, independently, hydrogen or a hydrocarbon based group and each of $R^6$, $R^7$ and $R^8$ is, independently, hydrogen or a hydrocarbon based group provided that at least one is a hydrocarbon based group containing at least 7 carbon atoms; with (B) at least one carboxylic reactant selected from the group consisting of compounds of the formula

and compounds of the formula

wherein each of $R^3$, $R^5$ and $R^9$ is independently H or a hydrocarbyl group, $R^4$ is a divalent hydrocarbylene group, and n is 0 or 1, wherein the ratio of reactants ranges from about 0.6 moles (B) per equivalent of (A), to about 1.5 moles (B) per equivalent of (A), wherein equivalents of (A) are defined herinafter.

Products prepared by this process are also provided.

DETAILED DESCRIPTION OF THE PREFERRED EMBODIMENTS

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon, hydrocarbyl or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being means that at least about 0.001% by weight of the material can be incorporated in a lubricating oil. For a further discussion of the terms oil soluble and dispersible, particularly "stably dispersible", see U.S. Pat. No. 4,320,019 which is expressly incorporated herein by reference for relevant teachings in this regard.

As noted hereinabove, provided by this invention are certain unsaturated hydroxycarboxylic compounds and a process for preparing low chlorine or chlorine free compositions useful as intermediates for preparing low chlorine or chlorine free additives for lubricating oil and fuel compositions.

The Compounds

In one embodiment, this invention relates to a composition comprising a compound of the formula

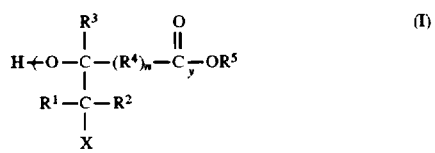

Each of
- $R^1$ and $R^2$ is H or a hydrocarbon based group. In one particular embodiment, each of $R^1$ and $R^2$ is independently H or a lower alkyl group provided that at least one is lower alkyl. In another embodiment, one of $R^1$ and $R^2$ is H and the other is a lower alkyl group. As used herein, the expression "lower alkyl" refers to alkyl groups containing from 1 to 7 carbon atoms. Examples include methyl, ethyl and the various isomers of propyl, butyl, pentyl, hexyl and heptyl. In one especially preferred embodiment, each of $R^1$ and $R^2$ is H.
- $R^3$ is H or hydrocarbyl. These hydrocarbyl groups are usually aliphatic, preferably alkyl, more preferably, lower alkyl. Especially preferred is where $R^3$ is H or methyl, most preferably, H.
- $R^4$ is a divalent hydrocarbylene group. This group may be aliphatic or aromatic, but is usually aliphatic. Often, $R^4$ is an alkylene group containing from 1 to about 10 carbon atoms, more often from 1 to about 3 carbon atoms. The 'n' is 0 or 1; that is, in one embodiment, $R^4$ is present and in another embodiment, $R^4$ is absent. More often, $R^4$ is absent.

The 'y' is an integer ranging from 1 to about 200, more often from 1 to about 50 and even more often from 1 to about 20. Frequently y is 1.

The group X has the formula

wherein each of $R^6$, $R^7$ and $R^8$ is independently H or a hydrocarbon based group, provided that at least one of $R^1$, $R^2$, $R^6$, $R^7$ and $R^8$ is a hydrocarbon based group containing at least 7 carbon atoms.

When at least one of $R^6$, $R^7$ and $R^8$ is a hydrocarbyl group, it contains from 7 to about 5,000 carbon atoms. More often, such hydrocarbon groups are aliphatic groups. In one embodiment $R^6$ is an aliphatic group containing from about 10 to about 300 carbon atoms. In another embodiment, $R^6$ contains from 30 to about 100 carbon atoms and is derived from homopolymerized and interpolymerized $C_{2-18}$ olefins.

In a further embodiment, at least one of $R^7$ and $R^8$ is an aliphatic group containing from 10 to about 300 carbon atoms. Often, at least one of $R^7$ and $R^8$ contains from about 30 to about 100 carbon atoms and is derived from homopolymerized and interpolymerized $C_{2-18}$ olefins. The polymerized olefins are frequently 1-olefins, preferably ethylene, propylene, butenes, isobutylene, and mixtures thereof. Polymerized olefins are often referred to herein as polyolefins.

In yet another embodiment at least one of $R^7$ and $R^8$ is an aliphatic group containing from 8 to about 24 carbon atoms. In another embodiment at least one $R^7$ and $R^8$ is an aliphatic group containing 12 to about 50 carbon atoms. Within this embodiment, most often one of $R^7$ and $R^8$ is H and the other is the aliphatic group.

$R^5$ is H or hydrocarbyl. When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl.

In one preferred embodiment, each of $R^1$, $R^2$ and $R^3$ is independently hydrogen or a lower alkyl or alkenyl group. In one especially preferred embodiment, each of $R^1$, $R^2$ and $R^3$ is hydrogen and n=0.

In another preferred embodiment, $R^6$ is an aliphatic group containing from about 8 to about 150 carbon atoms, $R^5$ is H, n is 0 and $R^3$ is H.

The Process

In another embodiment, the present invention relates to a process comprising reacting, optionally in the presence of an acidic catalyst, (A) at least one olefinic compound with (B) at least one carboxylic reactant wherein (A) and (B) are defined in greater detail hereinbelow.

The Catalyst

The process of this invention may be conducted in the presence of an acidic catalyst; however, no catalyst is required and it is often easier to prepare and isolate the monomeric product when no catalyst is employed.

However, when catalysts are used, yields are sometimes enhanced. Acid catalysts, such as organic sulfonic acids, for example, paratoluene sulfonic acid, methane sulfonic acid, heteropolylacids, the complex acids of heavy metals (e.g., Mo, W, Sn, V, Zr, etc.) with phosphoric acids (e.g., phosphomolybdic acid), and mineral acids, such as sulfuric acid and phosphoric acid, tend to lead to oligomeric products, especially when higher temperatures are also used. Lewis acids, e.g., BF₃, AlCl₃ and FeCl₃, are useful for promoting "ene" reactions, tend to promote formation of monomeric products, and usually do not hydrolyze esters.

When they are used, catalysts are used in amounts ranging from about 0.01 mole % to about 10 mole %, more often from about 0.1 mole % to about 2 mole %, based on moles of olefinic reactant.

(A) The Olefinic Compound

The olefinic compound employed as a reactant in the process of this invention has the general formula

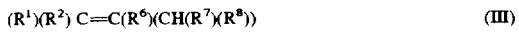   (III)

wherein each of $R^1$ and $R^2$ is, independently, hydrogen or a hydrocarbon based group and each of $R^6$, $R^7$ and $R^8$ is, independently, hydrogen or a hydrocarbon based group provided that at least one is a hydrocarbon based group containing at least 7 carbon atoms. These olefinic compounds are diverse in nature.

Virtually any compound containing an olefinic bond may be used provided it meets the general requirements set forth hereinabove for (III) and does not contain any functional groups (e.g., primary or secondary amines) that would interfere with the reaction with the carboxylic reactant (B). Useful olefinic compounds may be terminal olefins, i.e., olefins having a

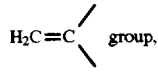

or internal olefins. Useful olefinic compounds may have more than one olefinic bond, i.e., they may be dienes, trienes, etc. Most often, they are mono-olefinic. Examples include linear α-olefins, cis- or trans- disubstituted olefins, trisubstituted and tetrasubstituted olefins.

When (A) is a mono-olefin, one mole of (A) contains one equivalent of C=C; when (A) is a di-olefin, one mole of (A) contains 2 equivalents of C=C bonds; when (A) is a tri-olefin, one mole of (A) contains 3 equivalents of C=C bonds, and so forth.

Aromatic double bonds are not considered to be olefinic double bonds within the context of this invention.

As used herein, the expression "polyolefin" defines a polymer derived from olefins. The expression "polyolefinic" refers to a compound containing more than one C=C bond.

Among useful compounds are those that are purely hydrocarbon, i.e., those substantially free of non-hydrocarbon groups, or they may contain one or more non-hydrocarbon groups as discussed in greater detail herein.

In one embodiment, the olefinic compounds are substantially hydrocarbon, that is, each R group in (III) is H or contains essentially carbon and hydrogen. In one aspect within this embodiment, each of $R^1$, $R^2$, $R^7$ and $R^8$ is hydrogen and $R^6$ is a hydrocarbyl group containing from 7 to about 5,000 carbon atoms, more often from about 30 up to about 200 carbon atoms, preferably from about 50 up to about 100 carbon atoms. In another aspect of this embodiment, each of $R^1$ and $R^2$ is hydrogen, $R^6$ is H or a lower alkyl group and the group $(CH(R^7)(R^8))$ is a hydrocarbyl group containing from 7 to about 5,000 carbon atoms, more typically from about 30 up to about 200 carbon atoms, preferably from 50 up to about 100 carbon atoms. In yet another aspect of the invention, the olefins are α-olefins containing from about 8, often from about 12 up to about 28, often up to about 18 carbon atoms.

In another embodiment, one or more of the R groups present in (III) is an organic radical which is not purely hydrocarbon. Such groups may contain or may be groups such as carboxylic acid, ester, amide, salt, including ammonium, amine and metal salts, cyano, hydroxy, thiol, tertiary amino, nitro, alkali metal mercapto and the like. Illustrative of olefinic compounds (III) containing such groups are methyl oleate, oleic acid, 2-dodecenedioic acid, octene diol, linoleic acid and esters thereof, and the like.

Preferably, the hydrocarbyl groups are aliphatic groups. In one preferred embodiment, when an R group is an aliphatic group containing a total of from about 30 to about 100 carbon atoms, the olefinic compound is derived from homopolymerized and interpolymerized $C_{2-18}$ mono- and di-olefins, preferably 1-olefins, especially those containing from 2 to 4 carbon atoms. Examples of such olefins are ethylene, propylene, butene-1, isobutylene, butadiene, isoprene, 1-hexene, 1-octene, etc. R groups can, however, be derived from other sources, such as monomeric high molecular weight alkenes (e.g., 1-tetracontene), aliphatic petroleum fractions, particularly paraffin waxes and cracked analogs thereof, white oils, synthetic alkenes such as those produced by the Ziegler-Natta process (e.g., poly-(ethylene) greases) and other sources known to those skilled in the art. Any unsaturation in the R groups may be reduced by hydrogenation according to procedures known in the art, provided at least one olefinic group remains, as described for (III).

In one preferred embodiment, at least one R is derived from polybutene, that is, polymers of $C_4$ olefins, including 1-butene, 2-butene and isobutylene. Those derived from isobutylene, i.e., polyisobutylenes, are especially preferred. In another preferred embodiment, R is derived from polypropylene. In another preferred embodiment, R is derived from ethylene-alpha olefin polymers, particularly ethylene-propylene polymers and ethylene-alpha olefin-diene, preferably ethylene-propylene -diene polymers Molecular weights of such polymers may vary over a wide range but especially those having number average moleculai weights ($M_n$) ranging from about 300 to about 20,000 preferably 700 to about 5000. In one preferred embodimen the olefin is an ethylene-propylene-diene copolymer having $M_n$, ranging from about 900 to about 2500. An example of such materials are the Trilene® polymers marketed by the Uniroyal Company, Middlebury, Conn., USA.

A preferred source of hydrocarbyl groups R are poly-butenes obtained by polymerization of a $C_4$ refinery strean having a butene content of 35 to 75 weight percent anc isobutylene content of 15 to 60 weight percent in the presence of a Lewis acid catalyst such as aluminum trichloride or boron trifluoride. These polybutenes contain pre-dominantly (greater than 80% of total repeating units isobutylene repeating units of the configuration

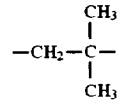

These polybutenes are typically monoolefinic, that is, they contain but one olefinic bond per molecule.

The olefinic compound may be a polyolefin comprising a mixture of isomers wherein from about 50 percent to abou 65 percent are tri-substituted olefins wherein one substituen contains from 2 to about 500 carbon atoms, often from abou 30 to about 200 carbon atoms, more often from about 50 to about 100 carbon atoms, usually aliphatic carbon atoms, and the other two substituents are lower alkyl.

When the olefin is a tri-substituted olefin, it frequently comprises a mixture of cis- and trans-1-lower alkyl, 1-(aliphatic hydrocarbyl containing from 30 to about 100 carbon atoms), 2-lower alkyl ethylene and 1,1-di-lower alkyl, 2-(aliphatic hydrocarbyl containing from 30 to about 100 carbon atoms) ethylene.

In one embodiment, the monoolefinic groups are vinylidene groups, i.e., groups of the formula

although the polybutenes may also comprise other olefinic configurations.

In one embodiment the polybutene is substantially monoolefinic, comprising at least about 30 mole %, preferably at least about 50 mole % vinylidene groups, more often at least about 70 mole % vinylidene groups. Such materials and methods for preparing them are described in U.S. Pat. Nos. 5,286,823 and 5,408,018, which are expressly incorporated herein by reference. They are commercially available, for example under the tradenames Ultravis (BP Chemicals) and Glissopal (BASF).

As is apparent from the foregoing, olefins of a wide variety of type and molecular weight are useful for preparing the compositions of this invention. Useful olefins are usually substantially hydrocarbon and have number average molecular weight ($\overline{M}n$) ranging from about 100 to about 70,000, more often from about 200 to about 7,000, even more often from about 1,300 to about 5,000 and frequently from about 400 to about 3,000.

Specific characterization of olefin reactants (A) used in the processes of this invention can be accomplished by using techniques known to those skilled in the art. These techniques include general qualitative analysis by infrared and determinations of average molecular weight, e.g., $\overline{M}n$, number average molecular weight, etc., employing vapor phase osmometry (VPO) and gel permeation chromatography (GPC). Structural details can be elucidated employing proton and carbon 13 ($C^{13}$) nuclear magnetic resonance (NMR) techniques. NMR is useful for determining substitution characteristics about olefinic bonds, and provides some details regarding the nature of the substituents. More specific details regarding substituents about the olefinic bonds can be obtained by cleaving the substituents from the olefin by, for example, ozonolysis, then analyzing the cleaved products, also by NMR, GPC, VPO, and by infra-red analysis and other techniques known to the skilled person.

(B) The Carboxylic Reactant

The carboxylic reactant is at least one member selected from the group consisting of compounds of the formula $$R^3C(O)(R^4)_nC(O)OR^5 \qquad (IV)$$

and compounds of the formula

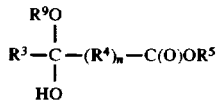

wherein each of $R^3$, $R^5$ and $R^9$ is independently H or a hydrocarbyl group, $R^4$ is a divalent hydrocarbylene group, and n is 0 or 1. Specific embodiments of the groups $R^3$ and $R^5$ are set forth hereinabove where corresponding groups in the compound (I) are described. $R^9$ is preferably H or lower alkyl.

Examples of carboxylic reactants (B) are glyoxylic acid, carboxy aromatic aldehydes, such as 4-carboxybenzaldehyde, and other omega-oxoalkanoic acids, keto alkanoic acids such as pyruvic acid, levulinic acid, ketovaleric acids, ketobutyric acids and numerous others. The skilled worker, having the disclosure before him, will readily recognize the appropriate compound of formula (V) to employ as a reactant to generate a given intermediate. Preferred compounds of formula (V) are those that will lead to preferred compounds of formula (I).

Reactant (B) may be a compound of the formula

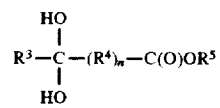

wherein each of $R^3$ and $R^5$ is independently H or hydrocarbyl preferably H or alkyl. Such compounds arise when the carboxylic reactant is hydrated. Glyoxylic acid monohydrate is a representative example.

From the foregoing, it is apparent that the various 'R' groups in the product (I) correspond to the same groups in the olefinic and carboxylic reactants.

The process of this invention is conducted at temperatures ranging from ambient up to the lowest decomposition temperature of any of the reactants, usually from about 60° C. to about 220° C., more often from about 120° C. to about 160° C. When the reaction is conducted in the presence of organic sulfonic acid or mineral acid catalyst, the reaction is usually conducted at temperatures up to about 150° C., often up to about 120° C., frequently from about 120° C. up to about 130° C. The process employs from about 0.6 moles of reactant (B) per mole of olefinic compound (A), to about 1.5 moles (B) per equivalent of (A), more often from about 0.8 moles (B) per mole of (A) to about 1.2 moles (B) per equivalent of (A), even more often from about 0.95 moles (B) per mole of (A) to about 1.05 moles (B) per equivalent of (A). In order to maximize yield of product of this invention, it is generally desirable to conduct the reaction at as low a temperature as possible. As noted herein, many reactants contain water which is removed. Removal of water at moderate temperatures is attainable employing reduced pressure, a solvent that aids in azeotropic distillation of water, or by purging with an inert gas such as $N_2$.

The progress of the reaction can be followed by observing the infra-red spectrum. The absorption for —COOH carbonyl of the products appears at about 1710 $cm^{-1}$. The total acid number as measured using essentially the procedure in ASTM D-664 (Potentiometric Method) or ASTM D-974 (Color Indicator Method) is useful together with the infrared, keeping in mind that non-acidic products (e.g., polyester products), those derived from non-acidic reactants and condensation products such as lactones will not display significant acid numbers.

These procedures appear in the Annual Book of ASTM Standards, Volume 05.01, ASTM, 1916 Race Street, Philadelphia, Pa., USA.

The following examples are intended to illustrate several compositions of this invention as well as means for preparing same. Unless indicated otherwise, all parts are parts by weight. It is to be understood that these examples are intended to illustrate several compositions and procedures of the invention and are not intended to limit the scope of the invention.

EXAMPLE 1

A reactor equipped with a stirrer, thermowell, Dean-Stark trap with condenser and sub-surface $N_2$ inlet is charged with 500 parts polyisobutylene having a number average molecular weight of about 230 and containing greater than 70 mole % of terminal vinylidene groups and 322 part 50% aqueous glyoxylic acid. The materials are heated to 150° C. and are held at 150° C. for 6 hours while removing water and maintaining a slow $N_2$ purge. The materials are diluted with 1000 parts toluene and extracted with two 500 part 5% sodium bicarbonate solutions. The combined sodium bicarbonate extracts are carefully acidified with a 5 % solution of hydrochloric acid to a pH=3 and the aqueous solution extracted with two 500 parts of toluene. Drying and evaporation of the combined toluene extracts affords the product. Infrared spectrum shows C=O at 1710 cm$^{-1}$, consistent with carboxylic acid.

EXAMPLE 2

A reactor equipped as in Example 1 is charged with 500 parts of the polyisobutylene of Example 1 and 222 parts glyoxylic acid ethyl ester. The materials are heated to gentle reflux. Heating is continued until the reflux temperature reaches 150° C. and the materials are held at 150° C. for 6 hours while maintaining a slow $N_2$ purge. Vacuum removal of unreacted glyoxylic acid ethyl ester affords the product and unreacted polyisobutylene.

EXAMPLE 3

A reactor equipped as in Example 1 is charged with 500 parts $C_{16}$ alpha-olefin and 330 part 50% aqueous glyoxylic acid. The material are heated to 150° C. and are held at 150° C. for 6 hours while removing water and maintaining a slow $N_2$ purge. The materials are diluted with 1000 parts toluene and extracted with two 500 parts of a 5% sodium bicarbonate solution. The combined sodium bicarbonate extracts are carefully acidified with a 5% solution of hydrochloric acid to a pH=3 and the aqueous solution is extracted with two 500 parts of toluene. Drying and evaporation of the combined toluene extracts affords the product.

EXAMPLE 4

A reactor equipped as in Example 1 is charged with 500 parts $C_{12}$ alpha olefin and 262 parts Glyoxylic acid methyl ester. The materials are heated to gentle reflux. Heating is continued until the reflux temperature reaches 150° C. and the materials are held at 150° C. for 6 hours while maintaining a slow $N_2$ purge. Vacuum removal of unreacted glyoxylic acid methyl ester affords the product and unreacted alpha olefin.

EXAMPLE 5

A reactor equipped as in Example 1 is charged with 300 parts polyisobutylene having a number average molecular weight of about 1000 and containing about 50% by weight of terminal vinylidene groups, 44 parts 50% aqueous glyoxylic acid and 1 part sulfuric acid. The materials are heated to 100° C. and are held at 100° C. for 1.5 hours while removing water under a slow $N_2$ purge. The materials are then heated to 125° C. and held at 125° C. for 2.5 hours then heated to 150° C. and held at 150° C. for 3 hours while continuing to remove water under a slow $N_2$ purge. The strong acid (neutralization number, bromphenol blue indicator) is neutralized by sodium hydroxide. At this point the materials contain by analysis (TLC-FID) 34.9% unreacted polyisobutylene. The materials are reheated to 110° C. and filtered through a diatomaceous earth filter aid. The filtrate has saponification no.=40 and total acid no.=12.0.

EXAMPLE 6

A reactor equipped as in Example 1 is charged with 300 parts polyisobutylene having a number average molecular weight of about 1000 and containing about 70 mole % of terminal vinylidene groups, 44 parts 50% aqueous glyoxylic acid and 1 part sulfuric acid. The materials are heated to 100° C. and are held at 100° C. for 1.5 hours while removing water under a slow $N_2$ purge. The materials are then heated to 125° C. and held at 125° C. for 2.5 hours, then heated to 150° C. and held at 150° C. for 3 hours while continuing to remove water under a slow $N_2$ purge. At this point the materials contain by analysis (TLC-FID) 27.2% unreacted polyisobutylene. The materials are reheated to 110° C. and filtered through a diatomaceous earth filter aid. The filtrate has saponification no.=35.7 and total acid no.=16.2.

EXAMPLE 7

A reactor equipped as in Example 1 is charged with 300 parts polyisobutylene having a number average molecular weight of about 1000 and containing about 50 mole % of terminal vinylidene groups and 44 parts 50% aqueous glyoxylic acid. The materials are heated to 100° C. and are held at 100° C. for 1.5 hours while removing water under a slow $N_2$ purge. The materials are then heated to 125° C. and held at 125° C. for 2.5 hours, then to 150° C. and held at 150° C. for 3 hours while continuing to remove water under a slow $N_2$ purge. At this point the materials contain by analysis (TLC-FID) 35.7% unreacted polyisobutylene. The materials are reheated to 110° C. and filtered through a diatomaceous earth filter aid. The filtrate has saponification no.=48 and total acid no.=14.2.

EXAMPLE 8

A reactor equipped with a Dean-Stark trap and condenser, thermometer and stirrer is charged with 168 parts of $C_{12}$ alpha olefin and 92 parts of glyoxylic acid monohydrate. The material are heated at 180°–210° C. for 10 hours while collecting 36 parts distillate (about 75% water) in the Dean-Stark trap. The materials are filtered at 25° C. using a diatomaceous earth filter aid. Saponification no.=231. Infrared spectrum shows —COOH and lactone C=O groups.

EXAMPLE 9

A reactor equipped as in Example 1 is charged with 269 parts 1-hexadecene and 222 parts 50% aqueous glyoxylic acid and heated under $N_2$ at reflux, 120° C. to 200° C., for 13 hours. Water is removed and collected in the Dean-Stark trap during the first 5.5 hours. The materials are cooled then stripped to 170° C. and 2 mm Hg for 1 hour. The residue is filtered with a diatomaceous earth filter aid. Saponification no.=78.9. Infrared shows —COOH and lactone C=O.

EXAMPLE 10

A reactor equipped as in Example 1 is charged with 210 parts $C_{12}$ alpha olefin and 100 parts glyoxylic acid monohydrate. The materials are heated under $N_2$ at 180°–195° C. for 7 hours, collecting 76 parts distillate then stripped at 83° C./6 mm Hg for 1 hour. The residue is filtered at 70°–80° C. using a diatomaceous earth filter aid. Saponification No.= 275. Infrared shows —COOH and lactone C=O.

EXAMPLE 11

A reactor is charged with 100 parts of the polyisobutylene of Example 7, 15 parts 4-carboxybenzaldehyde and 50 parts butanol. Heat to 120° C. (reflux). Infra-red spectrum does not indicate any changes. Heat to 210° C., removing butanol; hold 210° C. for 20 hours. Filter at 150° C. yielding a viscous liquid that solidifies on standing at room temperature. Acid No=20.6.

EXAMPLE 12

The process of Example 2 is repeated employing 0.1 mole % $AlCl_3$ catalyst.

EXAMPLE 13

The process of Example 4 is repeated employing 0.1 mole % $FeCl_3$ catalyst.

EXAMPLE 14

The process of Example 7 is repeated employing 0.2 mole % $BF_3$ catalyst.

EXAMPLE 15

The process of Example 1 is repeated replacing glyoxylic acid with an equal molar amount of pyruvic acid.

EXAMPLE 16

The process of Example 1 is repeated replacing glyoxylic acid with an equal molar amount of levulinic acid.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A composition comprising a compound of the formula $$H + O - \underset{\underset{\underset{X}{|}}{\underset{R^1 - C - R^2}{|}}}{\overset{R^3}{\overset{|}{C}}} - (R^4)_n - \overset{O}{\overset{\|}{C}}_y - OR^5 \quad (I)$$

wherein each of $R^1$ and $R^2$ is H or a hydrocarbon based group,
$R^3$ is H or hydrocarbyl;
$R^4$ is a divalent hydrocarbylene group;
n=0 or 1;
y is an integer ranging from 1 to about 200;
$R^5$ is H or hydrocarbyl; and
X is a group of the formula $$\underset{\underset{R^8}{\diagdown}}{\overset{R^6}{\diagdown}} C = C \underset{\diagdown}{\overset{R^7}{\diagup}} \quad (II)$$

wherein $R^6$ is an aliphatic group containing from about 10 to about 300 carbon atoms, each of $R^7$ and $R^8$ is independently H or a hydrocarbon based group.

2. The composition of claim 1 wherein each of $R^1$, $R^2$ and $R^3$ is independently hydrogen or a lower alkyl or alkenyl group.

3. The composition of claim 1 wherein $R^4$ is an alkylene group containing from 1 to about 10 carbon atoms.

4. The composition of claim 1 wherein each of $R^1$, $R^2$ and $R^3$ is hydrogen and n=zero.

5. The composition of claim 1 wherein $R^6$ contains from 30 to about 100 carbon atoms and is derived from homopolymerized and interpolymerized $C_{2-10}$ olefins.

6. The composition of claim 5 wherein the olefins are 1-olefins.

7. The composition of claim 6 wherein the 1-olefins are ethylene, propylene, butenes, isobutylene and and mixtures thereof.

8. The composition of claim 7 wherein the 1-olefin is isobutylene.

9. The composition of claim 1 wherein $R^6$ contains from 12 to about 50 carbon atoms.

10. The composition of claim 1 wherein y ranges from 1 to about 30.

11. The composition of claim 10 wherein y=1.

12. The composition of claim 1 wherein $R^5$ is lower alkyl.

13. The composition of claim 1 wherein $R^5$ is H.

14. The composition of claim 1 wherein each of $R^1$ and $R^2$ is independently H or lower alkyl provided that at least one is lower alkyl.

15. The composition of claim 14 wherein one of $R^1$ and $R^2$ is H and the other is lower alkyl.

16. The composition of claim 1 wherein each of $R^1$ and $R^2$ is independently H or lower alkyl provided that at least one is lower alkyl.

17. The composition of claim 16 wherein one of $R^1$ and $R^2$ is H and the other is lower alkyl.

18. A composition comprising a compound of the formula $$H + O - \underset{\underset{\underset{X}{|}}{\underset{R^1 - C - R^2}{|}}}{\overset{R^3}{\overset{|}{C}}} - (R^4)_n - \overset{O}{\overset{\|}{C}}_y - OR^5 \quad (I)$$

wherein each of $R^1$ and $R^2$ is H or a hydrocarbon based group,
$R^3$ is H or hydrocarbyl;
$R^4$ is a divalent hydrocarbylene group;
n=0 or 1;
y is an integer ranging from 1 to about 200;
$R^5$ is H or hydrocarbyl; and
X is a group of the formula $$\underset{\underset{R^8}{\diagdown}}{\overset{R^6}{\diagdown}} C = C \underset{\diagdown}{\overset{R^7}{\diagup}} \quad (II)$$

wherein $R^6$ is H or a hydrocarbon based group and at least one of $R^7$ and $R^8$ is an aliphatic group containing from about 30 to about 100 carbon atoms and is derived from homopolymerized and interpolymerized $C_{2-10}$ olefins.

19. The composition of claim 18 wherein each of $R^1$, $R^2$ and $R^3$ is independently hydrogen or a lower alkyl or alkenyl group.

20. The composition of claim 18 wherein $R^4$ is an alkylene group containing from 1 to about 10 carbon atoms.

21. The composition of claim 18 wherein each of $R^1$, $R^2$ and $R^3$ is hydrogen and n=zero.

22. The composition of claim 18 wherein the olefins are 1-olefins.

23. The composition of claim 22 wherein the 1-olefins are ethylene, propylene, butenes, isobutylene and mixtures thereof.

24. The composition of claim 18 wherein y ranges from 1 to about 30.

25. The composition of claim 24 wherein y=1.

26. The composition of claim 18 wherein $R^5$ is lower alkyl.

27. The composition of claim 18 wherein $R^5$ is H.

28. A composition comprising a compound of the formula

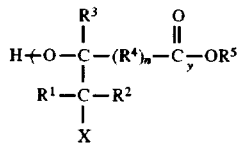

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

$R^5$ is H or hydrocarbyl; and

X is a group of the formula

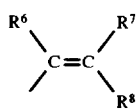

wherein each of $R^7$ and $R^8$ is independently H or a hydrocarbon based group, and $R^6$ is an aliphatic group containing from 8 to about 24 carbon atoms.

29. The composition of claim 28 wherein each of $R^1$, $R^2$ and $R^3$ is independently hydrogen or a lower alkyl or alkenyl group and $R^4$ is an alkylene group containing from 1 to about 10 carbon atoms.

30. The composition of claim 28 wherein each of $R^1$, $R^2$ and $R^3$ is hydrogen and n=zero.

31. The composition of claim 28 wherein y ranges from 1 to about 30.

32. The composition of claim 28 wherein $R^5$ is H or lower alkyl.

33. A composition comprising a compound of the formula

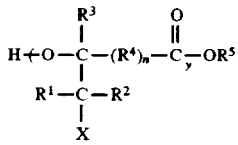

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

$R^5$ is H or hydrocarbyl; and

X is a group of the formula

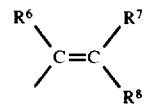

wherein $R^6$ contains from 12 to about 50 carbon atoms and each of $R^7$ and $R^8$ is independently H or a hydrocarbon based group.

34. The composition of claim 33 wherein each of $R^1$, $R^2$ and $R^3$ is independently hydrogen or a lower alkyl or alkenyl group.

35. The composition of claim 33 wherein $R^4$ is an alkylene group containing from 1 to about 10 carbon atoms.

36. The composition of claim 33 wherein each of $R^1$, $R^2$ and $R^3$ is hydrogen and n=zero.

37. The composition of claim 33 wherein y=1 and $R^5$ is H.

38. A composition comprising a compound of the formula

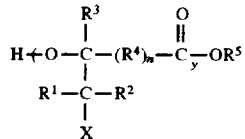

wherein each of $R^1$ and $R^2$ is H or a hydrocarbon based group, $R^3$ is H;

$R^4$ is a divalent hydrocarbylene group;

n=0;

y is an integer ranging from 1 to about 200;

$R^5$ is H; and

X is a group of the formula

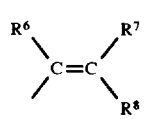

wherein $R^6$ is an aliphatic group containing from about 8 to about 150 carbon atoms and each of $R^7$ and $R^8$ is independently H or a hydrocarbon based group.

39. The composition of claim 38 wherein $R^4$ is an alkylene group containing from 1 to about 10 carbon atoms.

40. The composition of claim 38 wherein each of $R^1$, $R^2$ and $R^3$ is hydrogen and n=zero.

41. The composition of claim 39 wherein y ranges from 1 to about 30.

42. The composition of claim 40 wherein y=1.

* * * * *